US009659458B2

(12) United States Patent
Tinsman et al.

(10) Patent No.: US 9,659,458 B2
(45) Date of Patent: May 23, 2017

(54) GUILD-DEPENDENT VARIATION OF PLAYER CAPABILITIES IN A COMPUTER-IMPLEMENTED GAME

(71) Applicant: Zynga Inc., San Francisco, CA (US)

(72) Inventors: Brian Reid Tinsman, Austin, TX (US); Michael J. Engle, Daly City, CA (US)

(73) Assignee: Zynga Inc., San Francisco, CA (US)

( * ) Notice: Subject to any disclaimer, the term of this patent is extended or adjusted under 35 U.S.C. 154(b) by 34 days.

(21) Appl. No.: 14/206,148

(22) Filed: Mar. 12, 2014

(65) Prior Publication Data

US 2014/0274409 A1 Sep. 18, 2014

Related U.S. Application Data

(60) Provisional application No. 61/777,856, filed on Mar. 12, 2013.

(51) Int. Cl.
*A63F 13/30* (2014.01)
*G07F 17/32* (2006.01)

(52) U.S. Cl.
CPC ................................ *G07F 17/3274* (2013.01)

(58) Field of Classification Search
CPC .......... A63F 13/30; A63F 13/31; A63F 13/48; A63F 13/58; A63F 13/795
See application file for complete search history.

(56) References Cited

U.S. PATENT DOCUMENTS

2002/0045470 A1* 4/2002 Atsumi et al. .................... 463/1
2009/0149248 A1* 6/2009 Busey et al. .................... 463/29
2009/0325709 A1* 12/2009 Shi ........................ G06Q 10/10 463/42
2012/0034981 A1* 2/2012 Yamaguchi ..................... 463/42
2012/0244945 A1* 9/2012 Kolo et al. ...................... 463/42
2013/0096970 A1* 4/2013 Boss ................ G06Q 10/06398 705/7.14
2013/0254680 A1* 9/2013 Buhr ...................... A63F 13/12 715/753

* cited by examiner

*Primary Examiner* — James S McClellan
*Assistant Examiner* — Kevin Carter
(74) *Attorney, Agent, or Firm* — Schwegman Lundberg & Woessner, P.A.

(57) ABSTRACT

A system and method provide automated guild-dependent variation of in-game capabilities available to player in an computer-implemented game. An in-game capability is made available to the player in inter-guild competitive gameplay, for example comprising an object-specific ability associated with the game object, such as a collectible card. A value for a variable attribute of the in-game capability is dynamically adjusted based at least in part on one or more guild metrics for an associated guild of which the player is a member. The one or more guild metrics may include guild size and activity levels of guild members.

13 Claims, 12 Drawing Sheets

1000

Matrix of Guild Activity and Size

| | | Guild Size | | | | | | | | | |
|---|---|---|---|---|---|---|---|---|---|---|---|
| | | 1 | 10 | 20 | 30 | 40 | 50 | 60 | 70 | 80 | 90 |
| | | | | | | | | | | | |
| Members Active | 1 | 95 | 12 | 10 | 11 | 13 | 14 | 15 | 17 | 17 | 18 |
| Online | 5 | | 50 | 29 | 24 | 22 | 22 | 22 | 22 | 22 | 22 |
| | 10 | | 95 | 53 | 40 | 34 | 31 | 30 | 29 | 28 | 28 |
| | 15 | | | 77 | 56 | 45 | 41 | 38 | 36 | 34 | 33 |
| | 20 | | | 101 | 71 | 53 | 50 | 46 | 42 | 40 | 38 |
| | 25 | | | | 87 | 70 | 60 | 53 | 49 | 46 | 44 |
| | 30 | | | | 103 | 82 | 69 | 61 | 56 | 52 | 49 |
| | 35 | | | | | 93 | 79 | 69 | 63 | 58 | 54 |
| | 40 | | | | | 105 | 88 | 77 | 70 | 64 | 59 |
| | 45 | | | | | | 98 | 85 | 76 | 70 | 65 |
| | 50 | | | | | | 107 | 93 | 83 | 76 | 70 |
| | 55 | | | | | | | 101 | 90 | 82 | 75 |
| | 60 | | | | | | | 109 | 97 | 88 | 80 |
| | 65 | | | | | | | | 103 | 93 | 86 |
| | 70 | | | | | | | | 110 | 99 | 91 |
| | 75 | | | | | | | | | 105 | 96 |
| | 80 | | | | | | | | | 111 | 102 |
| | 85 | | | | | | | | | | 107 |
| | 90 | | | | | | | | | | 112 |

FIG. 10

GUILD-DEPENDENT VARIATION OF PLAYER CAPABILITIES IN A COMPUTER-IMPLEMENTED GAME

RELATED APPLICATION

This application claims the benefit of priority to U.S. Provisional Patent Application Ser. No. 61/777,856, filed on Mar. 12, 2013, which is incorporated by reference herein in its entirety.

TECHNICAL FIELD

The present disclosure generally relates to computer-implemented games. The disclosure relates, more particularly, to multiplayer online games.

BACKGROUND

There is currently a variety of online games available. Some of these games may include a virtual world or some other imagined playing space where a player of the game controls one or more player characters. Other online games may have no player-controllable player characters, with game play instead being conducted on a two-dimensional gameboard, and/or based on player manipulation of non-character game objects. Examples of the latter include collectible card games (CCGs), where the player controls a set of cards and interacts with other players and/or the game based on skills or abilities defined by the respective cards.

In each of these games, a player may complete objectives or tasks. A player may also play against another player of the game by battling or attacking the other player's character or cards, for example. Some games may also provide for the formation of guilds. A guild is a formal association of players in the game. Competitive gameplay may in some cases be limited to inter-guild interactions, in which the competing players are in different respective guilds. Game rules often provide that each player can be a member of one guild only.

BRIEF DESCRIPTION OF THE DRAWINGS

The present disclosure is illustrated by way of example, and not limitation, in the figures of accompanying drawings. In the drawings.

FIG. 10 illustrates an example graph for determination of a guild effect value based on calculated guild metrics for a player, according to an example embodiment.

DESCRIPTION OF EXAMPLE EMBODIMENTS

Overview

Figure 1:
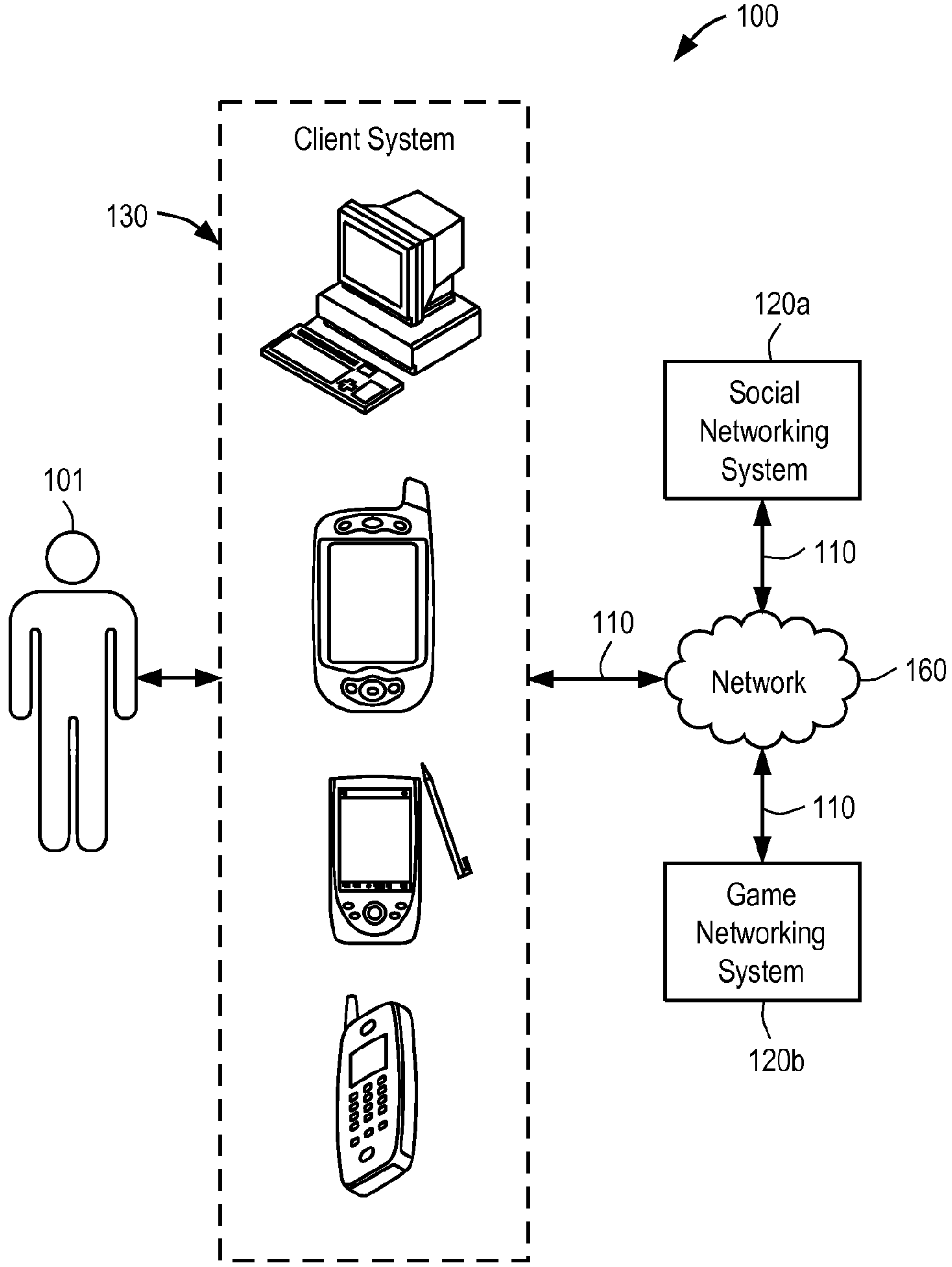
FIG. 1 illustrates an example system for implementing a game, according to an example embodiment.

According to one aspect of the disclosure there is provided a system and method for guild-dependent variation of in-game capabilities available to player in an computer-implemented game.

The method may include providing to a player an in-game capability available to the player in inter-guild competitive gameplay, and dynamically setting a value for the variable attribute of the in-game capability based at least in part on one or more guild metrics for an associated guild of which the player is a member. Inter-guild gameplay means competitive interaction between players who are members of different respective guilds.

In some embodiments, the computer-implemented game may have collectible game objects with different respective in-game abilities. In such case, the variable attribute of the in-game capability may be a variable attribute of the in-game ability provided by an associated game object. Gameplay by the player with respect to the in-game ability of the game object may thus be affected by the one or more guild metrics for the guild of which the player is a member. In this manner, in-game activities of guild members may automatically influence the attributes of in-game abilities/capabilities available to other guild members.

In one embodiment, the game objects may comprise collectible cards, in which case the game may be of the type known in the art as collectible card games (CCG), with the game using a specially designed set of playing cards. Each card may have one or more and associated ability or skill which can be used to battle or complete against another player's cards. These abilities provided to the player by the respective cards are also referred to herein as object-specific abilities. In this regard, note that each CCG typically has a fundamental set of rules that describes the players' objectives, the categories of cards used in the game, and the basic rules by which the cards interact.

Each card may have additional text explaining that specific card's effect on the game (e.g., by explaining that specific card's associated ability, which may be unique to the specific card). The cards are often illustrated and named for elements relating to a theme or subject of the game, with the card's ability often being related to the theme/subject. For example, a CCG based on the fantasy genre may have many cards that represent fantasy creatures and magical spells. A Dragon card, for example, may carry an illustration of a dragon, and may have a flying ability that a specified as having a quantified effect on certain types of defensive cards. Another example of a card-specific ability defined on the card is: "Enemy Undead get −500 DEF," meaning that opposition cards of the Undead type suffer a reduction of 500 points in defensive ability if the card is executed.

In one embodiment, players can select from their pool of available cards those cards which are to compose their active deck. This allows a CCG player to strategically customize their deck to take advantage of favorable card ability interactions, combinations and statistics.

In one embodiment, the method comprises calculating a guild effect value for the player based at least in part on the one or two guild metrics for the associated guild, and adjusting the variable attribute of one or more in-game capabilities (e.g., of the abilities of a number of cards in the player's deck) based on the calculated guild effect value. The guild effect value is also referred to herein as a guild force. The one or more guild metrics upon which the guild effect value (or guild force) is based may include a game activity metric based on a level of game activity by members of the associated guild. For example, if guild members are active and play the game daily, then the guild force for that guild may be high. The game activity metric may be an active member value that indicates how many guild members recently played the game, for example within a predefined preceding period. In one embodiment, active member value is determined based on guild member activity within the preceding day. Instead, or in addition, the guild force may also be determined based on a guild size metric that indicates how many players are members of the associated guild, i.e. based on the number of guild members.

The game may provide in-game functionality for enabling players to encourage or prompt other guild members to play the game, thereby to improve the guild force or guild effect value applicable to the player.

The variable attributes of respective in-game capabilities may thus automatically and dynamically increase for the guild and/or for the guild members, responsive to guild force increase. In one instance, the variable attribute is a trigger probability that represents a probability for actual availability of the specific ability of the associated card (or other game object). Effective in-game deployment modes of a particular ability may in such cases be binary alternatives, in which, responsive to user input to use the ability, the ability is either deployed fully, or is not deployed at all. Setting of the variable attribute value based on the calculated guild effect value may thus compromise dynamically adjusting the associated trigger probability responsive to changes in the calculated guild effect value.

Defined differently, the skill or unique ability of a card may have a pre-determined chance of success (e.g., a default trigger probability) associated with it, with "success" here meaning that the skill or ability is actually triggered. The guild force can in such cases increase the pre-determined chance of success of the card. The chance of success or trigger probability can be expressed as a percentage. A trigger probability of, say, 50%, within such cases mean that the associated in-game capability or ability to statistically be expected to be available 50 times out of 100 iterations in-game competitive use.

Note that, in some embodiments, cards (or other in-game objects, depending on the game type) may have a general abilities and special abilities. The general abilities may be common to all or some of the cards, although the attributes of the ability may vary from card to card. All defensive cards, for example, may have a defensive ability that may vary in value from one card to the next. Special abilities/skills, however, may be unique to their respective cards. In one embodiment, about 90% of all available cards have special skills. In one example embodiment, the trigger probability applies only to special abilities, with general abilities being unaffected by the trigger probability of the card.

In one example embodiment, when a player enters a battle with another player, the chance of success of the card and the guild force can determine the outcome of the battle. If the outcome is not favorable, then the player may rally his guild members to play the game, in order to increase the guild force applicable to the player. Influencing the outcome of a game based on the guild force provides a strong incentive to play the game regularly, to support guild members.

The special abilities of the set of cards may be arranged to drive collection of cards. Thus, some cards may have special abilities that are amplified or cooperative with the special abilities of a particular other card. The special ability of a particular card may, for example, be that "If you have Blazing Angel, this card gets +1000 Attack." Another example of strategically combinable cards comprises a first card with the special abilities that "Enemy Corrupted cards get −500 DEF," while the special ability of a second card may be that, "All your enemy's cards become Corrupted."

Although the example embodiments described herein refer to a collective card game, the concept of guild force can also be applied to any other games. Other games may include games where the player's performance or game outcome can be influenced by the percentage of active guild members. For example, games involving tower defense or multiplayer online battle arena (MOBA), where players build units on a battlefield, can use guild force to determine a chance of success of the player's fighting units when the player enters into a battle.

Variable attributes of in-game capabilities may instead, or in addition, in some embodiments comprise a power or effect of a particular in-game action or an associated game object. A damaged level or a strike range of an offensive unit in a strategic clan-based warfare game may, for example, be automatically varied depending on a current value of a guild effect value or guild force (which may in such cases be synonymously referred to as a clan effect value or clan force).

Instead of, or in addition to influencing a battle outcome, the guild force may also influence the outcome of a quest performed by a single player. For example, a player may engage in a quest or task for obtaining a game piece that can be used while playing the game. The guild force of the player's guild may increase the chance of the player succeeding in his quest.

Example System

FIG. 1 illustrates an example system for implementing a game, according to an example embodiment. The system 100 can include a user 101, a social network system 120*a*, a game networking system 120*b*, a client system 130, and a network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

The user 101 can be a player of a game. The social network system 120*a* may be a network-addressable computing system that can host one or more social graphs. The social networking system 120*a* can generate, store, receive, and transmit social networking data. The social network system 120*a* can be accessed by the other components of system 100 either directly or via network 160. The game networking system 120*b* is a network-addressable computing system that can host one or more online games. The game networking system 120*b* can generate, store, receive, and transmit game-related data, such as, for example, game account data, game input, game state data, and game displays. The game networking system 120*b* can be accessed by the other components of system 100 either directly or via network 160. User 101 may use the client system 130 to access, send data to, and receive data from the social network system 120*a* and the game networking system 120*b*.

The client system 130 can access the social networking system 120 and/or the game networking system 120*b* directly, via network 160, or via a third-party system. In an example embodiment, the client system 130 may access the game networking system 120*b* via the social networking system 120*a*. The client system 130 can be any suitable device, such as work stations, computers, general purpose computers, Internet appliances, hand-held devices, wireless devices, portable devices, wearable computers, cellular or mobile phones, portable digital assistants (PDAs), portable navigation systems, vehicle installed navigation systems, smart phones, tablets, ultrabooks, netbooks, laptops, desktops, multi-processor systems, microprocessor-based or programmable consumer electronics, game consoles, set-top boxes, network PCs, mini-computers, smartphones, tablets, and the like.

Although FIG. 1 illustrates a particular number of users 101, social network systems 120*a*, game networking systems 120*b*, client systems 130, and networks 160, it should be understood that any suitable number of users 101, social network systems 120*a*, game networking systems 120*b*, client systems 130, and networks 160 can be implemented in the system 100. For example, the system 100 may include one or more game networking systems 120*b* and no social networking systems 120*a*. As another example, the system 100 may include a system that comprises both the social networking system 120*a* and the game networking system 120*b*. Moreover, although FIG. 1 illustrates a particular arrangement of the user 101, the social network system 120*a*, the game networking system 120*b*, the client system 130, and the network 160, it should be understood that any suitable arrangement of user 101, social network system 120*a*, game networking system 120*b*, client system 130, and network 160 can be implemented in the system 100.

The components of the system 100 may be connected to each other using any suitable connections 110. For example, the connections 110 may include a wireline connection (such as, for example, Digital Subscriber Line (DSL) or Data Over Cable Service Interface Specification (DOCSIS)), a wireless connection (such as, for example, Wi-Fi or Worldwide Interoperability for Microwave Access (WiMAX)) or an optical connection (such as, for example, Synchronous Optical Network (SONET) or Synchronous Digital Hierarchy (SDH)). In an some embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between the user 101, the social network system 120*a*, the game networking system 120*b*, the client system 130, and the network 160, it should be understood that any suitable connections between player 101, social network system 120*a*, game networking system 120*b*, client system 130, and network 160 can be implemented in the system 100. For example, the client system 130 may have a direct connection to the social network system 120*a* or the game networking system 120*b*, bypassing network 160.

The game networking system 120*b* may in some instances managed a plurality of players guilds with respect to a particular game, with each guild consisting of multiple guild members. In some embodiments, competitive gameplay is limited to the inter-guild play, in which players from different guilds compete against each other. For some games, each player 101 may be a member of one guild only. Note that the formation and management of player guilds may be game-specific, so that that respective guilds for different games may, for the same player, be different. In contrast, social networks administered by the social networking system 120*a* will typically be the same for different games.

Examples of Determining Guild Force and Skills

It is to be appreciated that different games may have different virtual gameboards or virtual spaces in which gameplay occurs. Such virtual gameboards or virtual spaces may be presented to a player in a game user interface displayed via a client device of the player.

Figure 2:
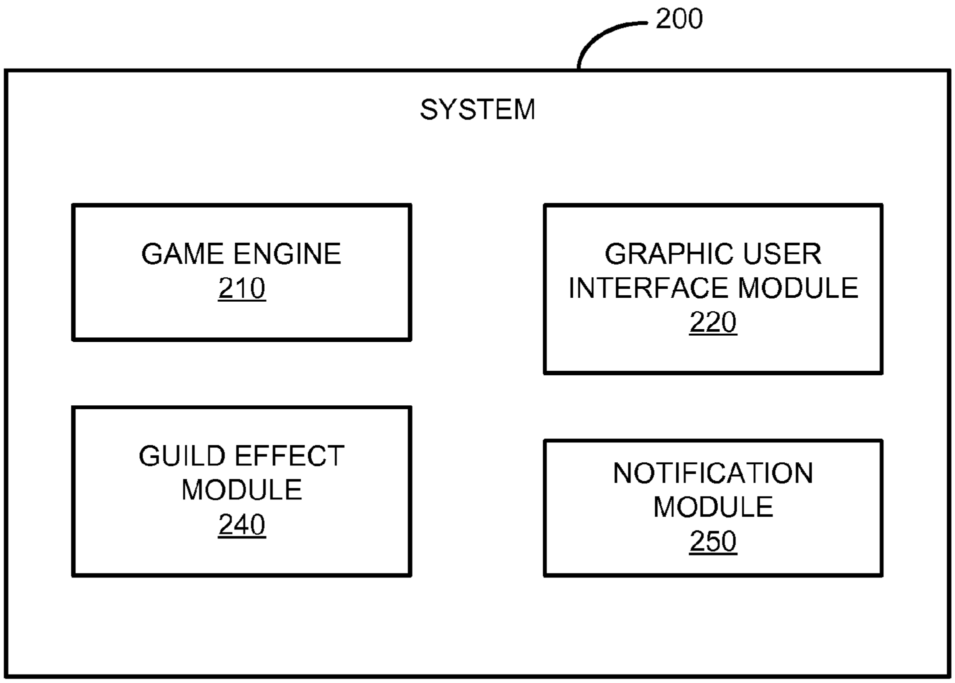
FIG. 2 illustrates example components of a game networking system, according to an example embodiment.

FIG. 2 illustrates example components of a system 200, according to an example embodiment. The system 200 may include a game engine 210, a graphical user interface (GUI) module 220, a guild effect module 240, and a notification module 250.

The game engine 210 may be a hardware-implemented module, which may manage and control any aspects of a game based on rules of the game, including how a game is played, players' actions and responses to players' actions, and the like. The game engine 210 may be configured to generate a game instance of a game of a player and may determine the progression of a game based on user inputs and rules of the game. The game engine 210 may determine game outcome based on cards skills, guild force, and trigger probability of the card. The game outcome may also be determined based on a guild force threshold.

The GUI module 220 may be a hardware-implemented module, which may control information or data that is provided to client systems for display on a client device. For example, the GUI module 220 may be configured to provide display data associated with displaying a game instance of a game, displaying a game user interface associated with one or more games, displaying game moves of a player, and the like. The GUI module 220 may further be configured to receive user inputs for processing by the game engine 210 based on rules of the game. For example, the GUI module 220 may receive user inputs indicating functions, such as a game move or action made by a player, rallying requests by a player, and the like.

The guild effect module 240 may be a hardware-implemented module configured to determine and apply a guild force for a player's guild. A guild force may be a numerical value. For example, the guild effect module 240 may calculate the guild force based on a guild size, activity of guild members, and a baseline. The guild effect module 240 may monitor guild members' activity within the game. For example, the guild effect module 240 may track the time respective guild members logged into and out of the game, the duration a guild member played the game, how long it has been since a guild member played last, and the like.

The notification module 250 may be a hardware-implemented module configured to send game notifications to players. For example, the notification module 250 may receive a request from a player to notify another guild member that the guild force is relatively low, in response to which the notification module 250 may send a corresponding notification to the other guild member's client device. The notification module 250 may also send a notification to a player's device when the guild force is high.

Figure 3:
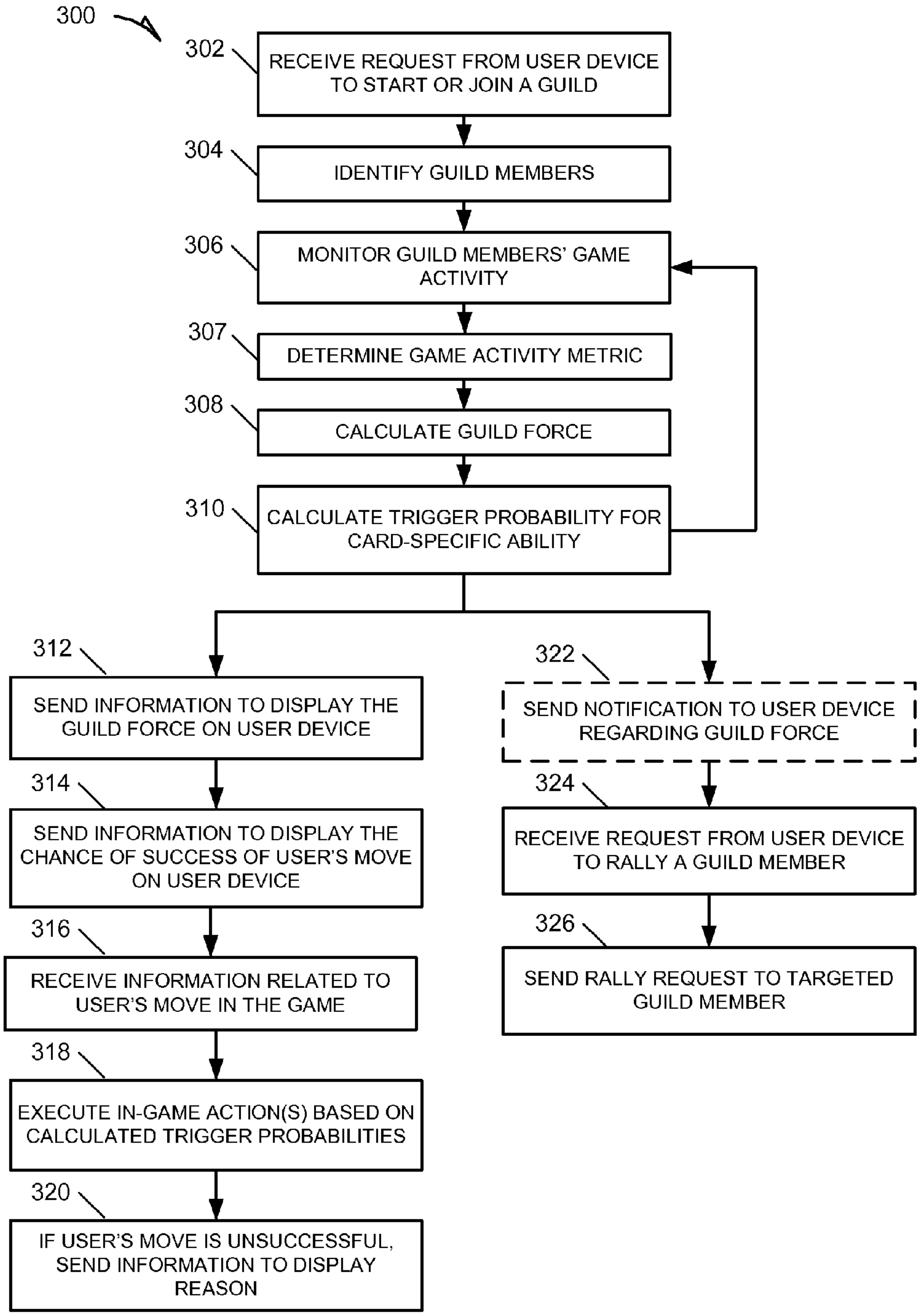
FIG. 3 is a flow chart illustrating an example method for determining guild force and skills, according to an example embodiment.

FIG. 3 is a flow chart illustrating an example method 300 for determining guild force and skills, according to an example embodiment. In some embodiments, the method 300 may be performed using the system 200 shown in FIG. 1 and FIG. 2.

At operation 302, the game engine 210 receives a request from a user, via an associated user device, to start or join a guild. As noted before, a guild is one of a plurality of formal association of players of the game. With "formal association" is meant that the association is recognized in automated management of the game, with one or more in-game benefits or responsibilities being associated with membership of the formal association.

The user or player may want to start his own guild in a game, or the player may join an existing guild in the game. A guild can have a guild leader who manages the guild members. The guild leader may add new members and remove members from the guild. In some embodiments, the player can be a member of one guild only. The game engine 210 may receive the request based on a user input from the player on the client device. The game interface displayed on the client device may include a mechanism for the player to send a request to start or join a guild.

At operation 304, the guild effect module 240 identifies guild members. The guild effect module 240 identifies as guild members players who are members of the particular guild that the player started or joined at operation 302. At operation 306, the guild effect module 240 monitors guild members' game activity. For example, the guild effect module 240 may monitor activities such as the last time a guild member logged in to the game, the last time a guild member played the game, how long it has been since a guild member played the game, the type of moves a guild member played (battle versus quest), and the like. Note that the monitoring of guild member activity, at operation 306, may be performed continually or continuously, to enable dynamic and ongoing guild force determination and in-game capability adjustment.

At operation 307, a game activity metric for the guild is automatically calculated based on the monitored in-game activity of the guild members. In this example embodiment, the game activity metric comprises a level of game activity comprising an active member value (referred to below as the "active count") that indicates the number of guild members who were active in the game within a predefined preceding period, in this example being within the preceding 24 hours. The guild effect module 240 may also determine a guild size metric based on how many players are members of the associated guild. This value is referred to below as the "guild size." In this example embodiment, the guild size and the active count together provide the guild metrics upon which calculation of the guild force is based.

At operation 308, the guild effect module 240 calculates the guild effect value, or guild force. In this example embodiment, the guild force is calculated based on the following formula:

guild force=activity bonus+size bonus+baseline.

The activity bonus may be a function of the activity metric (e.g., the active count), and the size bonus may be a function of the guild size metric (e.g., the guild size). In this example embodiment, the activity bonus is a function both of the activity metric and the guild size matrix, and accordance with the following example equation:

activity bonus=active count/guild size*activity multiplier, wherein:

Active count is the number of members who logged on in the last 24 hours.

Guild size is the total number of members in the guild.

Activity multiplier is a pre-determined fixed parameter. In this example embodiment, the activity multiplier is 95.

The size bonus is in this example embodiment calculated according to the formula:

$$\text{size bonus}=40*(1/(1+e\hat{}(-\text{guild size}/35)))-20.$$

Note that different formulas for the size bonus may be used in other embodiments. The baseline is in this example embodiment a predetermined fixed parameter.

In one example embodiment, the baseline in the guild force equation is 0. In other embodiments, the baseline may be different. The baseline may be set by a game administrator to be higher than 0 if it emerges that guilds are struggling to attain sufficiently high guild force values in a particular game.

In an example embodiment, the guild force formula accounts for the difficulty of coordinating a large guild. In such cases, a smaller proportion of guild members may need to active if the guild is large, compared to a smaller guild, in order to achieve a particular guild force value. Instead, or in addition, the guild force may be calculated such that sensitivity of the guild effect value to proportionally similar changes in the level of game activity decreases with an increase in the guild size metric. See, for example, the guild force matrix 1000 of FIG. 10. Consider, for example, differently sized guilds with the same portion of active members. For a guild size of 10 members, a 50% activity rate (i.e. five active members) results in a guild force value of 50. A 50% activity rate for a guild size of 40 members (i.e., 20 active members) results in a guild force value of 53. For a guild having 80 members, however, a 50% activity rate translates to a guild force value of 64.

In some embodiments, a predefined guild force threshold can only be exceeded if an associated guild size threshold is exceeded, thereby to prevent abuse with multiple accounts. For example, the guild force can in one embodiment increase above 50% only for guilds with 5 or more members. If guilds with 5 or fewer members would otherwise have been eligible for an above-threshold guild force (in this example, 50 or more), members of that guild may automatically be sent a notification to "Increase guild size to raise Max Guild Force."

In some games, a guild leader may have the ability to eject (or "boot") guild members from the guild. To limit abuse, however, the method may in some instances comprise enforcing a predefined cooldown period subsequent to most recent player activity or subsequent to player admission to the guild, with member ejection being available to the guild leader only after the expiry of the predefined time period. In this example embodiment, a guild leader has a 24 hr cooldown period before they can boot the respective guild member out of their guild. This cooldown period is to curb the booting a number of inactive guild members at once, and provides greater opportunity for inactive members to respond to messages from guild members to reactivate. Guild leaders may in some embodiments be able to pay a premium (real currency or virtual in-game currency) to skip or circumvent the cooldown period, letting competitive leaders rebuild teams quickly.

In some embodiments, a guild member may pay a premium (real currency or virtual in-game currency) to increase his guild force. This may increase the guild force for only the paying guild member, while the guild force of the other guild members may not be affected. In other embodiments, the guild force may be for all guild members responsive to payment of a guild force premium by any one of the guild members.

Figure 9:
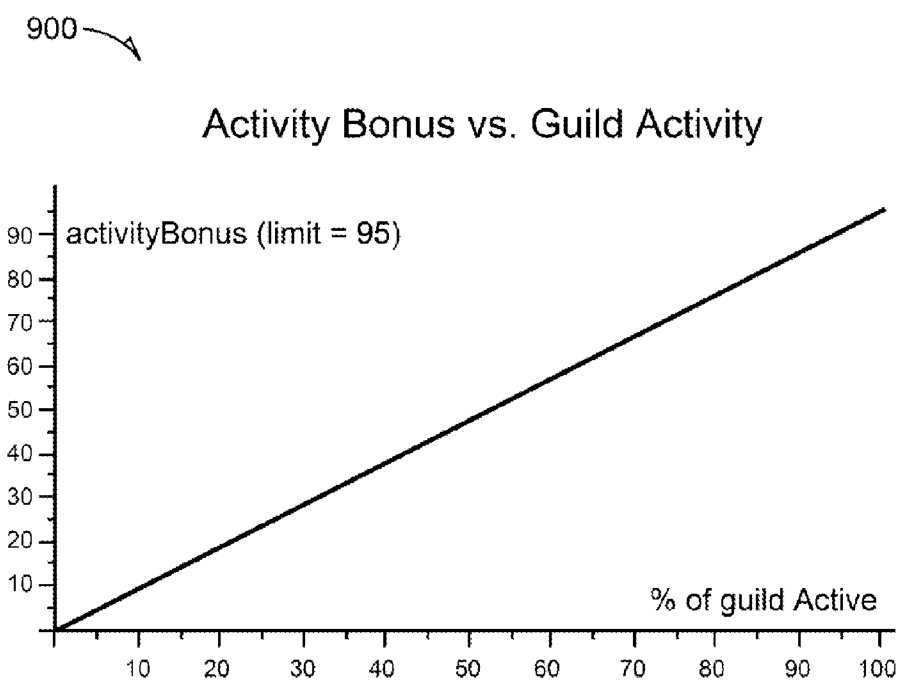
FIG. 9 illustrates example graphs for calculation of respective values for two different guild metrics, according to an example embodiment.
Figure 9:
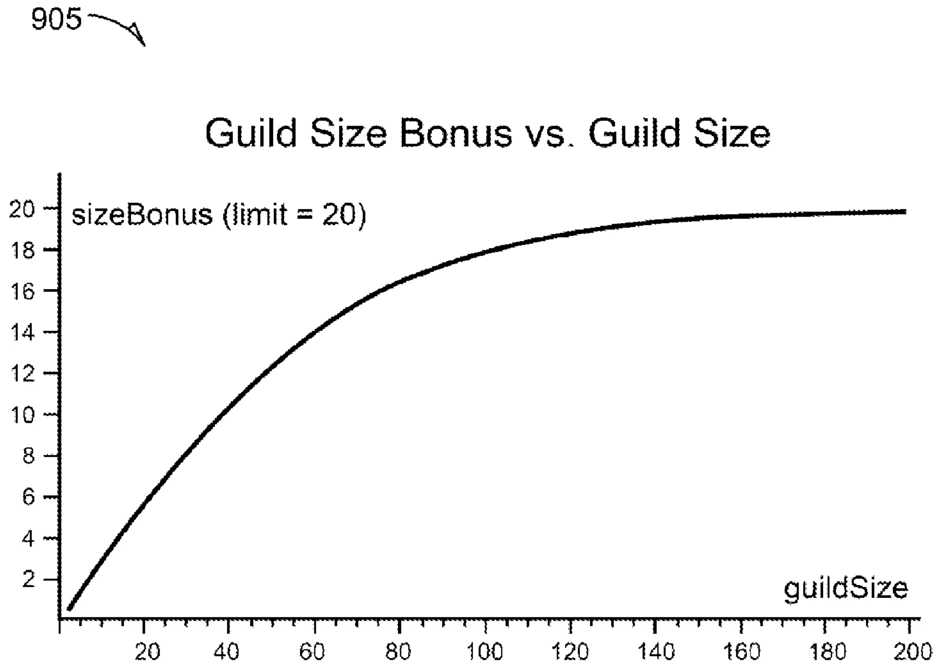

FIG. 9 illustrates example graphs 900, 905 related to the above-exemplified guild force equation. Graph 900 shows the activity bonus a guild activity metric comprising the percentage of guild members are counted as active. As illustrated, an increase in the guild activity corresponds to an increase in the activity bonus and, in this example embodiment being directly proportional. Graph 905 shows the guild size bonus against the guild size. As illustrated, sensitivity of the guild size bonus to changes in the guild size progressively decreases, so that a given proportional change in guild size has a smaller effect on the guild size bonus for smaller guild sizes.

FIG. 10 illustrates an example graph 1000 of a matrix for guild force values calculated according to the above-exemplified equations for different active count values against different guild sizes.

At operation 310, the game engine 210 determines a value for a variable attribute associated with an in-game capability, based on the calculated guild force value. In this example embodiment, the calculation at operation 310 comprises calculating a trigger probability for one or more cards in the player's active deck, the example game being a CCG, in which player moves or actions include one or more cards to use in battle or other competitive game action against a member of another guild.

The trigger probability may be represented as a percentage probability for the associated ability to actually become available, e.g., for the card's special abilities or skills to trigger in a battle. Each card can have a respective initial or default trigger probability. The trigger probability for the card may be increased by an increase in the currently applicable guild force value. In this example embodiment, the trigger probability for a particular card is calculated as a cumulative value of the default trigger probability and the calculated guild force value. For example, if a card has a 40% trigger probability and the guild force is 46, then the trigger probability for the card may be 86%.

At operation 312, the guild effect module 240 sends information to display the guild force on a game interface presented by the user device. In an example embodiment, a game interface may display the guild force as applying equally to a number of game objects (e.g., cards). An example of such a game interface will be discussed in more depth below with reference to FIG. 4.

At operation 314, the to display respective variable attribute values associated with one or more in-game capabilities, based on the calculated guild force. In the current example embodiment, comprising a card game, display of the variable attribute values comprises displaying respective trigger probabilities for a number of cards in the player's active deck (see, for example, FIG. 5). Although not shown in this example, respective trigger probabilities for an equal number of cards in an active deck of the opposing player may also be displayed. It will be appreciated that the trigger probabilities of the opposing player's cards are calculated based on a guild force value for the opposing player's guild.

At operation 316, the game engine 210 receives information related to the user's move or game action. For example, if the user is playing a card game, the user's move or action may include using his cards to battle against another player's cards. The user's move or action may include completing a task or obtaining a card. In this example embodiment, the player's move comprises selecting from a pool of available cards five cards for inclusion in an active deck (see, for example, FIGS. 4 and 5).

At operation 318, the game engine 210 executes one or more in-game action(s) based at least in part on the calculated trigger probabilities, in accordance with the rules of the game. For example, the example card game of FIGS. 4 and 5, the game engine 210 may perform a partly random determination, based on respective trigger probabilities, to identify, for each of the active cards, whether or not the special ability of the card is triggered during the current competitive engagement. The game engine 210 further analyzes the triggered special abilities/skills for the player, against the triggered special abilities/skills of the opposing player. Based on this analysis, the game engine 210 determines the outcome or result of the competitive engagement or battle.

Note that automated resolution of the competitive engagement or battle based on respective active decks of the two players involved (e.g., based on five-card decks such as that illustrated in FIGS. 4 and 5) may be resolved card by card, with the respective players alternately selecting a particular card to trigger, so that each card faces off against one other card. In other embodiments, the battle may be resolved in a place of confrontation, and when the cumulative triggered abilities of one card deck are deployed against the cumulative triggered abilities of the other card deck.

Note that the outcome of the competitive engagement is thus at least in part dependent on the trigger probability of the respective cards, and is thus at least in part dependent on the respective guild force values of the players. As discussed above, the trigger probability of a card is the probability that the card skills are triggered or executed in a battle. The base trigger probability may be specified per-card in that card's content definition. As such, different cards can have different base trigger probabilities. It will be appreciated that, for a low trigger probabilities, the likelihood or chance that the associated card skill executes his low, and the outcome of the game and may thus not be as the player expected. Because the trigger probabilities of cards can be increased based on the guild force, the player's chances or prospects of success in the battle is increased by an increase in the guild force.

In an example embodiment, the game mechanics may be set up such that a new player may initially find or be provided with relatively weak cards, in that the unique in-game abilities/skills of the cards may be less powerful than the abilities of cards to which the player later has access. Weaker cards, however, may be assigned relatively high base trigger probabilities, therefore being more reliable in battle. In one embodiment, such relatively weak starting cards may have a 100% base trigger probability. This means they always trigger. The game mechanics may further the configured such that, as the player advances in the game, they may find or be provided with stronger cards, but the base trigger probability of the cards gradually decreases. In other words, the set of cards (or other game objects) may be configured such that there is an inverse relationship between the power or effectiveness of card ability and base trigger probability. In this example embodiment, for example, the strongest cards may have about 15% base trigger probability, requiring significant guild force values for reliable functioning. In one example embodiment, progressively stronger tiers of cards may be available in the game. With each higher tier, the base trigger probability may be reduced, and may eventually reach negative values.

In executing the user's move or game action at operation 318, the game engine 210 may consider a "cool-down" time for the card. For example, certain cards may have powerful abilities or skills. Such cards may be rare, which may be the reason for their powerful skills. In that case, one of the game rules may include a cool-down time for the card, which allows the card to be played only a certain number of times during a predetermined time. For example, a player may only be able to play this powerful card once every hour or once every day. In another example, a player may only be able to play the powerful card after a predetermined period has passed since the card was last played. In some embodiments, the user may pay a premium (real currency or virtual in-game currency) to by-pass the cool-down time for the card.

In some embodiments, the game engine 210 may consider a guild force threshold in executing the user's move at operation 318. The guild force threshold may comprise a predetermined guild force value which is to be exceeded by the currently applicable guild force value as precondition for execution of card abilities. The guild force value may be a fixed parameter universally applicable to all players of the game. In other embodiments, the guild force threshold may be a variable as a function of one or more guild metrics. The guild force threshold may, for example, be variable dependent on guild size. In such cases, different guilds may have different guild force thresholds based on their respective guild sizes. If the player's current guild force is smaller than the guild force threshold, then the player's card may not execute its skills, even though it may have a high trigger probability. The user's movement will in such cases be unsuccessful, resulting in loss of the battle.

At operation 320, the game engine 210 sends an explanatory message in response to failure of a move and/or in response to failure of a particular ability to execute. Information to display reason on user device if the user's move is unsuccessful. For example, the user may have entered into a battle with another player, and may not have succeeded and lost the battle. If the user is playing a card game, the user may have lost the battle because the card skills did not trigger based on the card's trigger probability. In that case, the game engine 210 may send information regarding the user's guild force to the user device for display. The user device may display a message stating that the user should increase his guild force by rallying his guild members. A user may rally guild members by asking them or encouraging them to play the game. As will be described with reference to FIG. 6, a game user interface displayed on the client device may provide expedited or one-click rally functionality to the user. For example, a UI element such as a "rally" soft button 655 may form part of the game user interface, with player selection of the soft button resulting in automated transmission of a rally message to an associated guild member.

Returning now to FIG. 3, it will be seen that the method may include, at operation 322, sending a notification to the user device regarding guild force. The notification module 250 may be configured automatically to notify the user periodically of the player's current guild force value. The notification module 250 may, for example, send a notification once a day or once a week. In an example embodiment, the user may be able to configure the frequency at which guild force notifications are sent.

Figure 7:
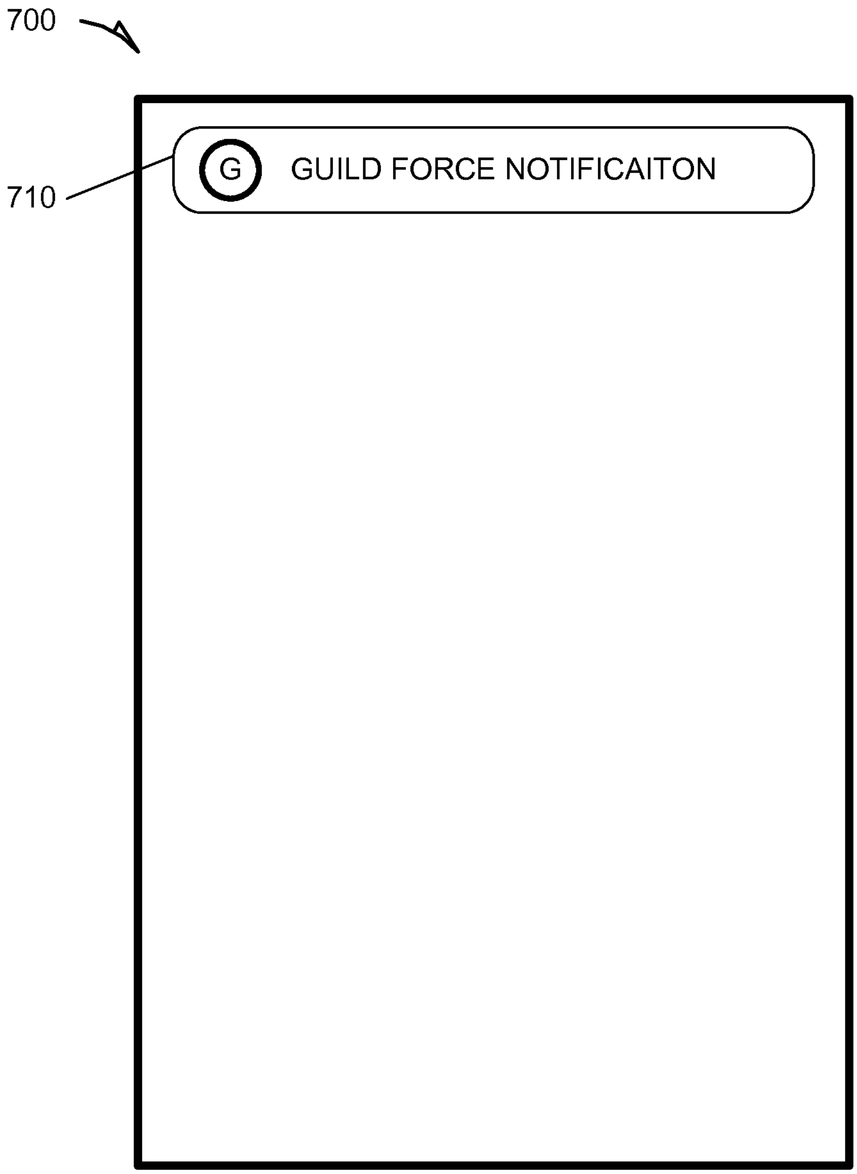
FIG. 7 illustrates an example user interface, according to an example embodiment.
Figure 8:
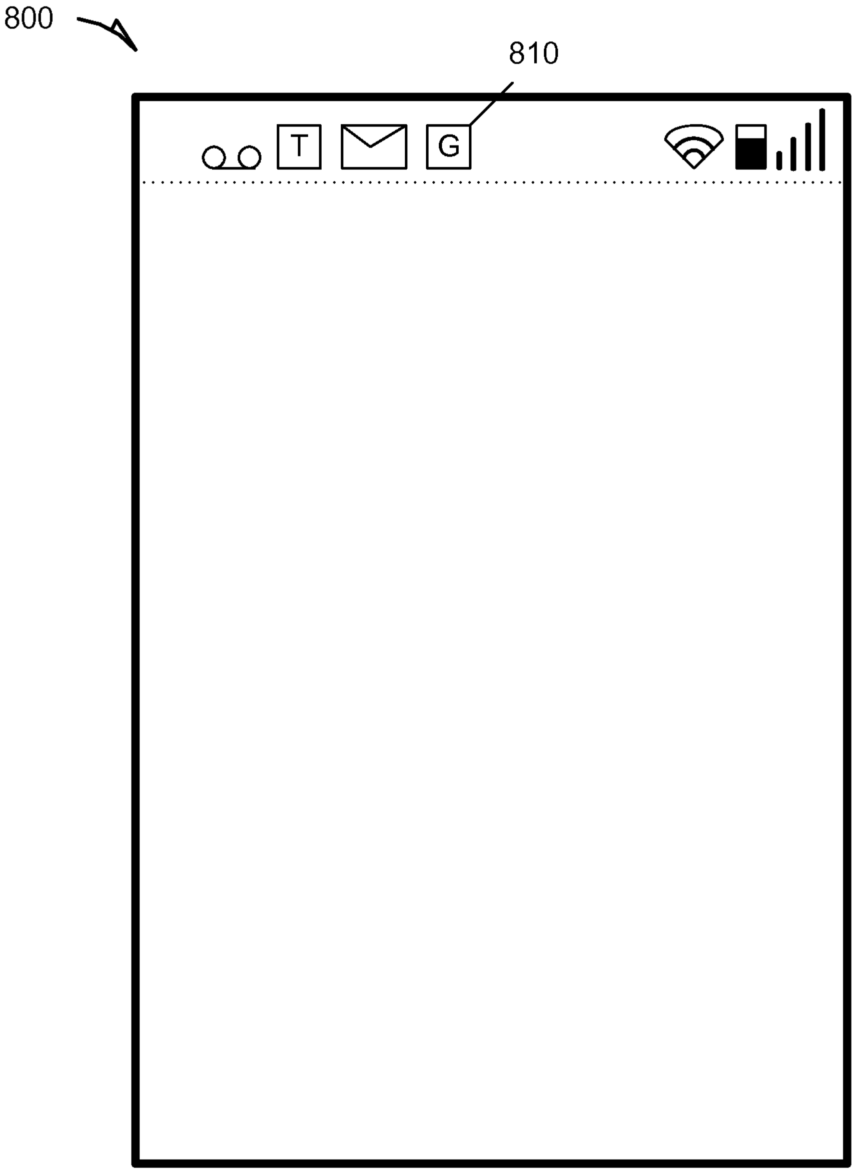
FIG. 8 illustrates an example user interface, according to an example embodiment.

Instead, or in addition, the notification module 250 may be configured automatically to notify the user when the player's guild force is at peak, or is above a predefined notification threshold. For example, the guild force may be at peak when all the guild members have played the game in the last 24 hours, in response to which the notification module 250 may automatically send a corresponding notification to the user device. If the user device is a smartphone, then the notifications may be displayed as an iOS push notification or an Android notification, examples of which are illustrated in FIGS. 7-8. The notifications may instead, or in addition, comprise a message sent to the player's social media account or email account.

In some embodiments, the notification module 250 may be configured to display a message during the game, if predefined notification criteria are satisfied. The player may, for example, be notified of a low guild force value before committing to a competitive engagement or battle. Thus, before the user enters in a battle, a player may be notified that the guild force is low and that the player's move will likely not be successful.

Figure 6:
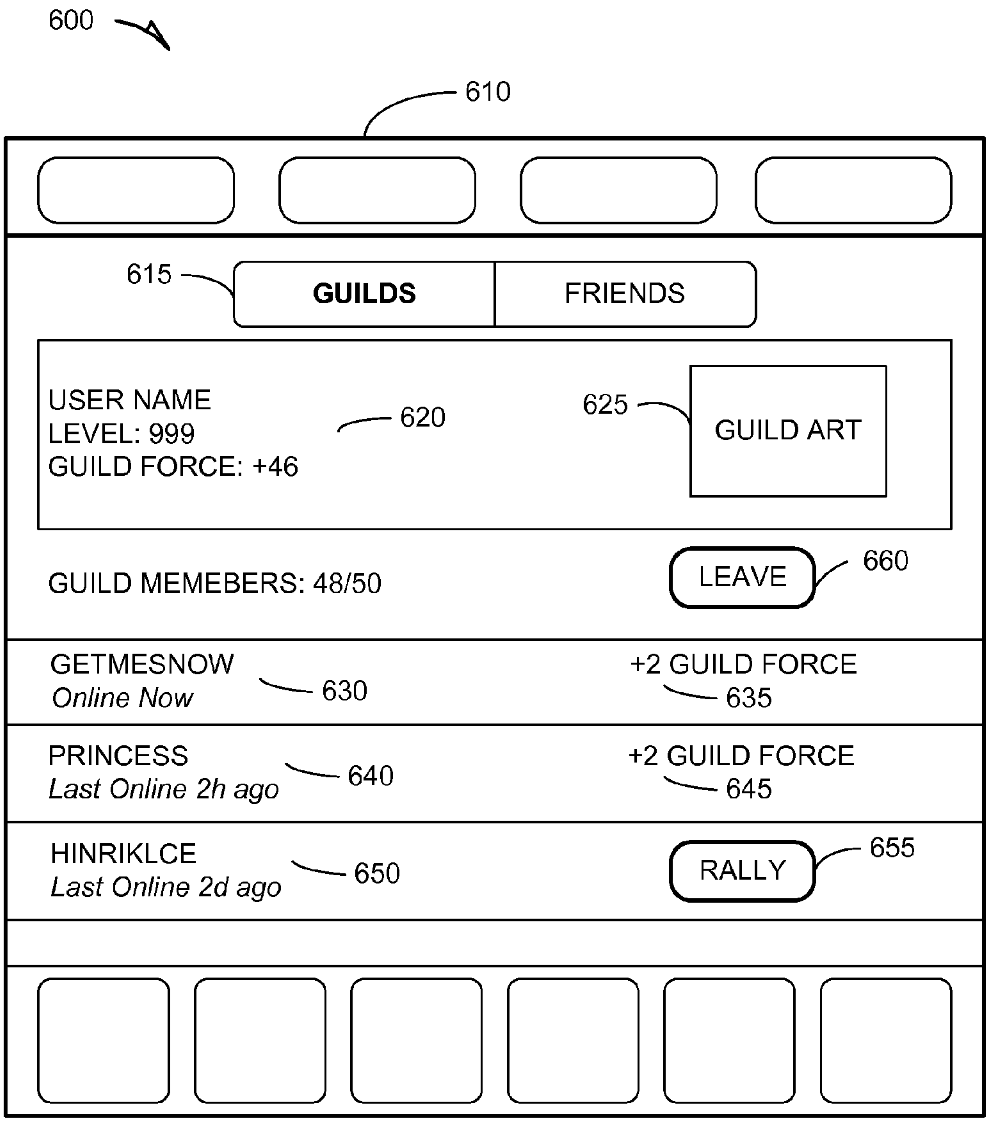
FIG. 6 illustrates an example user interface for a game, according to an example embodiment.

Returning again to FIG. 3, the method may include, at operation 324, receiving user input from user device to rally a guild member. The user may want to increase the guild force so that there moves have a higher trigger probability. As discussed above, the guild force is affected by the number of active guild members and the last time the guild members were active. In an example embodiment, the game interface may display guild activity information in association with member-specific user interface elements providing member-specific rally functionality. The guild activity information may include a list of guild members together with their respective in-game activity data. Based on the activity, the game interface may include a rally button near a guild member, as illustrated in FIG. 6, so that the user can rally that particular guild member. Additional features of a game interface for displaying the guild activity information and facilitating rallying of guild members will be described below with reference to FIG. 6.

At operation 326 (FIG. 3), the notification module 250 may send the rally request to the target guild member. The notification module 250 sends the rally request based on the player input received at operation 324. The notification may be sent to the guild member device as an iOS push notification (illustrated in FIG. 7), Android notification (illustrated in FIG. 8), a social media message, an email message, a sound, a light, or the like.

Figure 4:
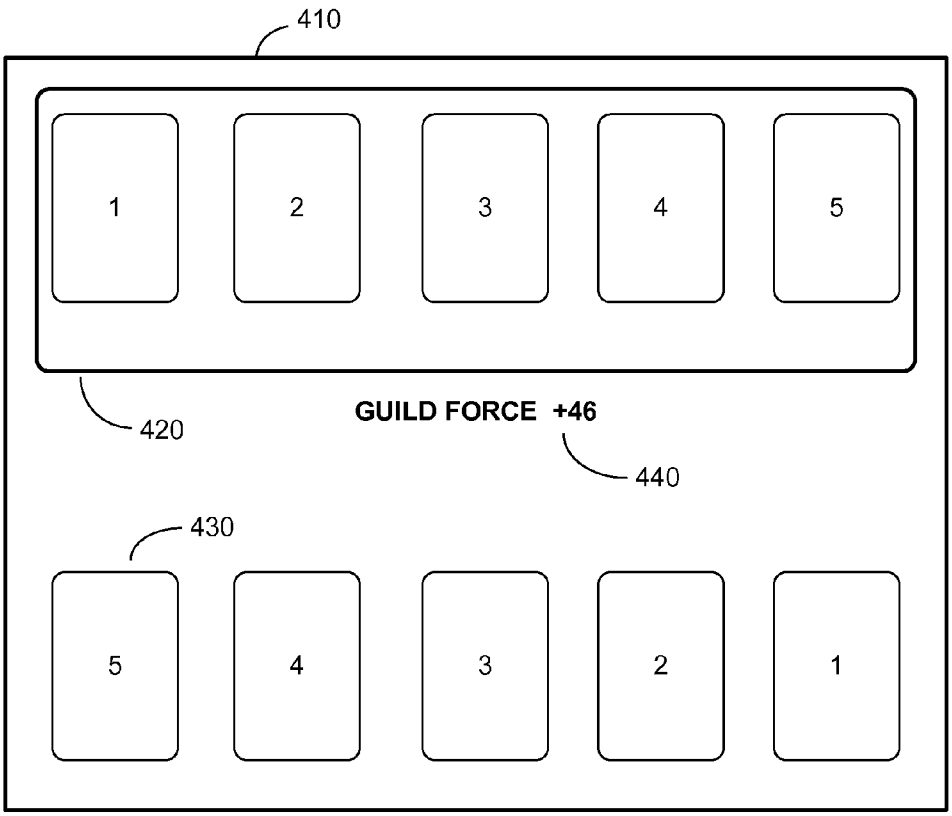
FIG. 4 illustrates an example user interface for a game, according to an example embodiment.

FIG. 4 illustrates an example game user interface 410 displayed on a user device for a CCG game, according to an example embodiment. Cards 420 is in this example embodiment the active deck of cards selected by the player on whose user device the game UI 410 is displayed. Here, the active deck comprises five cards 420, number one through five in FIG. 4. Cards 430 may together constitute the active deck of the opposing player. The opposing player is a member of a different guild, so that a different guild force value applies to the opposing player. The game UI 420 may include a guild force indication 440 that displays the current guild force value applicable to the player for the battle at hand. In this example, the guild force value is 46. Note that, although cards 420 and 430 are illustrated as blank numbered cards, it should be understood that cards 420 and 430 include art and text identifying the respective cards, together with icons, text, or other symbols indicating respective card abilities and/or attributes. In some embodiments, the card attributes displayed on the respective cards may include respective default trigger probabilities.

Figure 5:
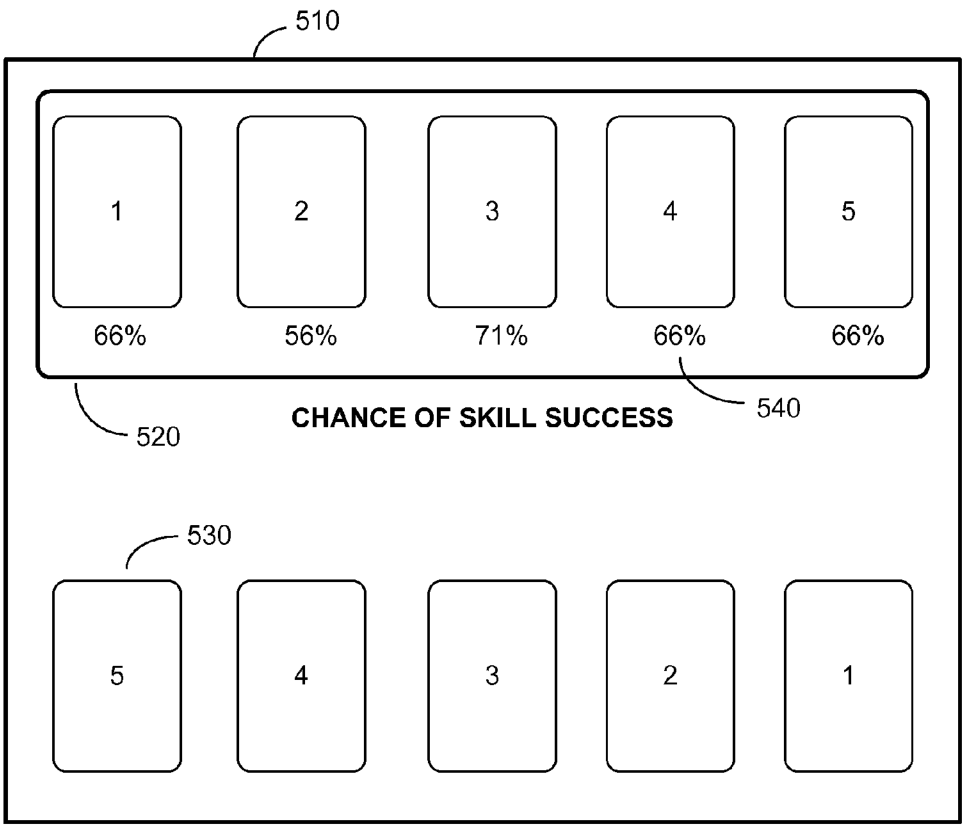
FIG. 5 illustrates an example user interface for a game, according to an example embodiment.

FIG. 5 illustrates an example game user interface 510 for a game, according to another example embodiment. The game user interface 510 is similar to the game UI 410 of FIG. 4, comprising opposing five-card decks made up by the selected cards 520 of the active player, and the selected cards 530 of the opposing player. The game UI 510, however, is configured by default not to display the guild force value (as is the case for FIG. 4), but to display respective guild force-sensitive variable attributes for the respective cards 520. As will be evident from what has gone before, the variable attributes of the cards 520 is in this example embodiment the current trigger probabilities 540 of the respective cards 520. Although element 540 shows each trigger probability as being displayed beneath the respective card 520, it will be appreciated that the trigger probability of a card may, in other embodiments, be displayed elsewhere in the interface 510.

In one example embodiment, the information shown in FIGS. 4 and 5 may be displayed in succession in the same user interface. For example, at the beginning of the battle, the current guild force for the player may be displayed, followed by display of respective trigger probabilities for the player's cards. Thereafter, the guild force for the opposing player may be displayed, followed by display of respective trigger probabilities for the opposing player's cards.

FIG. 6 illustrates an example guild user interface 610 for a game, according to an example embodiment. In this example, the guild UI 610 comprises a guild page providing a scrollable list of guild members together with associated guild force-related information. Tab 615 is a guild tab. Selecting tab 615 displays information for a player's guild. Guild UI 610 displayed the logged in player's user name, current game level and guild force value, indicated generally by numeral 620.

Guild UI 610 may also include guild art 625. Guild art 625 may be an icon, image, drawing, and the like that may represent the guild. The guild art 625 may be chosen by the guild members. Guild UI 610 includes a list of guild members as illustrated by elements 630, 640, and 650. Elements 630, 640, and 650 include the name of the guild member and the last time the guild member logged on. Guild UI 610 may include an increase in current guild force due to the in-game activity of the associated guild member, as illustrated by elements 635 and 645. A respective member prompt object or rally UI element, such as rally button 655, may be displayed in association with each guild member who is currently inactive, or who is not currently contributing to the guild force. For example, guild members illustrated by elements 630 and 640 logged on within the last 24 hours, which activity resulted in guild force increase by 2 points each. On the other hand, guild member illustrated by element 650 last logged in two days ago, and rally button 655 is displayed for that guild member so that the user can prompt or rally the guild member 650 to log in and play the game. Guild UI 610 may include a leave button 660. The user can select leave button 660 when he wants to leave the guild.

FIG. 7 illustrates an example user interface 700 displayed on a user device, according to an example embodiment. Interface screen 700 may be an interface screen for a mobile phone having an iOS operating system. Interface screen 700 may display the notification as a push notification 710. The push notification 710 is shown at the top of the user interface screen 700, however, it is understood that the push notification 710 may be displayed anywhere on the user interface screen 700. The push notification 710 may include an icon and text associated with the icon. Different icons may indicate different game information. For example, one icon may indicate guild force information, another icon may indicate another player's request for battle, another icon may indicate a guild member's rally request. Corresponding text may be displayed with different icons in the push notification 710. The user may be able to click or select or touch the push notification 710 to view more information. Upon clicking, selecting, or touching the push notification 710, the client device may start the game on the client device. The user may also be able to use a voice command to select the notification.

FIG. 8 illustrates an example user interface 800 displayable on a user device, according to an example embodiment. Interface screen 800 may be an interface displayed on a mobile phone using an Android operating system. Interface screen 800 displays the notification as a bar notification 810. The bar notification 810 is shown at the top of the user interface screen 800, however, it is understood that the bar notification 810 may be displayed anywhere on the interface screen 800. In some embodiments, the bar notification 810 may display an icon indicating a notification. Different icons may indicate different game information. For example, one icon may indicate guild force information, another icon may indicate another player's request for battle, and another icon may indicate a guild member's rally request. Various other icons may be displayed along the bar notification 810 that indicate other device information, such as voicemail, text message, email, wireless signal, battery status, cell phone signal, and other similar information. The user may be able to click or select or touch the bar notification 810 to view more information. Upon clicking, selecting, or touching the bar notification 810, the client device may start the game on the client device. The user may also be able to use a voice command to select the notification.

One benefit of the above-describe example system and method is that it promotes continued player involvement in the game. Players are incentivized to maintain high levels of game activity by the fact that each guild member's activity strengthens the in-game abilities of other guild members. Display of a quantified contribution to the guild force for each respective guild member further promotes game involvement through public honoring/shaming within the guild. The provision of member-specific rally functionality from within the game facilitates encouragement between guild members for remaining active in the game.

Various technical aspects of the implementation of the above-described game systems and game functionality will now be described.

Online Games and Game Systems

An online game can be hosted by the system 200, which can be accessed from the client system 130. A user may have a game account on the system 200, wherein the game account can contain a variety of information associated with the user (e.g., the player's personal information, financial information, purchase history, player character state, game state). In some embodiments, a user may play multiple games on the system 200, which may maintain a single game account for the user with respect to all the games, or multiple individual game accounts for each game with respect to the user. In some embodiments, the system 200 can assign a unique identifier to each user 101 of an online game hosted on the system 200. The system 200 can determine that the user 101 is accessing the online game by reading the player's cookies, which may be appended to HTTP requests transmitted by the client system 130, and/or by the user 101 logging onto the online game.

In some embodiments, user 101 may access an online game and control the game's progress via the client system 130 (e.g., by inputting commands to the game at the client device). The client system 130 can display a game interface, receive inputs from the user 101, transmit user inputs or other events to the game engine, and receive instructions from the game engine. The game engine can be executed on any suitable system (such as, for example, the client system 130, the social networking system 120*a*, or the system 200). For example, the client system 130 may download client components of an online game, which are executed locally, while a remote game server, such as the system 200, provides backend support for the client components and may be responsible for maintaining application data of the game, processing inputs from the user, updating and/or synchronizing the game state based on the game logic and input from the user, and transmitting instructions to the client system 130. In another example, each time user 101 provides an input to the game through the client system 130 (such as, for example, by typing on the keyboard, clicking the mouse of the client system 130 or tapping the touchscreen of the client system 130), the client components of the game may transmit the player's input to the system 200.

In an online multiplayer game, players may control player characters (PCs) or player cards, a game engine controls non-player characters (NPCs) and game features, and the game engine also manages player character and card state and game state and tracks the state for currently active (i.e., online) players and currently inactive (i.e., offline) players. A player character can have a set of attributes (which may include object-specific abilities) and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In some games, no avatar or other graphical representation of the player character may be displayed. Similar to a player character, a player's card can have a set of attributes and skills associated with it. A card state can refer to any in-game characteristic of the player's card, such as attack points, defense points, special powers, skills, rarity, and the like. Player's cards may be displayed as a card with an image that represents the type of card. In some card games, the player's cards may be displayed without an image.

Game state encompasses the notion of player character state and player's card state, and refers to any parameter value that characterizes the state of an in-game element, such as a non-player character, a virtual object, etc. The game engine may use player character and card state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. Generally, a player card's probability of having a more favorable outcome is greater when the card's trigger probability is high. The player character state and the player card state can be affected by the guild force as described above. If the guild force is higher, then the player character state will be better, and the card's trigger probability will be better.

In some embodiments, user 101 may access particular game instances of an online game. A game instance is a copy of a specific game play area that is created during runtime. In some embodiments, a game instance is a discrete game play area where one or more users 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In some embodiments, a game instance is populated by one or more player characters and cards controlled by one or more users 101 and one or more in-game objects controlled by the game engine. When accessing an online game, the game engine may allow user 101 to select a particular game instance to play from a plurality of game instances. Alternatively, the game engine may automatically select the game instance that user 101 will access. In other embodiments, an online game comprises only one game instance that all users 101 of the online game can access.

In example embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's player character or cards and one or more in-game objects associated with the first player. In some embodiments, a game instance associated with a specific player may only be accessible by that specific player. For example, a first player may access a first game instance when playing an online game and this first game instance may be inaccessible to all other players. In alternative embodiments, a game instance associated with a specific player may be accessible by one or more other players, either synchronously or asynchronously with the specific player's game play. For example, a first player may be associated with a first game instance, but the first game instance may be accessed by all friends in the first player's social network. In an example embodiment, the game engine may create a specific game instance for a specific player when that player accesses the game. For example, the game engine may create a first game instance when a first player initially accesses an online game, and that same game instance may be loaded each time the first player accesses the game. As another example, the game engine may create a new game instance each time a first player accesses an online game, wherein each game instance may be created randomly or selected from a set of predetermined game instances. In some embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him.

In some embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier can be assigned to each user in the social graph. It is also not a limitation of this description that two players who are deemed "friends" for the purposes of this disclosure are not friends in real life (i.e., in disintermediated interactions or the like), but that could be the case.

Game Systems

A game event may be an outcome of an engagement or battle, a provision of access, rights and/or benefits, or the obtaining of some assets (e.g., health, money, strength, inventory, land, etc.). A game engine determines the outcome of a game event according to a variety of factors, such as the game rules, card skills, guild force, a player character's in-game actions, player character state, game state, interactions of other player characters, and random calculations. Engagements can include simple tasks (e.g., obtain a card, enhance a card, plant a crop, clean a stove), complex tasks (e.g., battle opponent, build a farm or business, run a café), or other events. Battle may include fighting another player character or playing a card or cards against another player's card or cards.

A player may have a game system account that can contain a variety of information about the player (e.g., the player's personal information, player's collected cards, player character state, game state, etc.). In some embodiments, an online game can be embedded into a third-party website. The game can be hosted by the networking system of the third-party website, or it can be hosted on game system and merely accessed via the third-party website. The embedded online game can be hosted solely on a server of game system or using a third-party vendor server. In addition, any combination of the functions of the present disclosure can be hosted on or provided from any number of distributed network resources. For example, one or more executable code objects that implement all or a portion of the game can be downloaded to a client system for execution.

Game Interfaces

Referring again to FIG. 1, in some embodiments, the user 101 of the client system 130 may use a browser client to access the online game over the Internet (or other suitable network). In other embodiments, the user 101 may access the game via an application (app) downloaded on the client system 130. For example, user 101 may have downloaded an app for the game on to his smart phone or tablet, and the user 101 can access the game via the downloaded app. The game interface 600 illustrated in FIG. 6 may be automatically generated and presented to the user in response to the user accessing the game operator's website, a third-party's website, or the app on the client system 130. The system 200 can transmit data to the client system 130 allowing it to display the game interface 600, which is typically some type of graphical user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. The game interface 600 is configured to receive signals from the user 101 via the client system 130. For example, the user 101 can click on the game interface 600, or enter commands from a keyboard or a mouse, or in the case of the client system 130 having a touch-sensitive screen, the user 101 can tap on the screen to enter commands. The game engine can respond to these signals to allow game play. The display of the game interface 600 can change based on the output of the game engine, the input of the player, and other signals from game system 120*b* and client system 130.

A game interface can display various game components, such as the game environment, options available to the player (e.g., in-game actions, preferences, settings, etc.), game results, etc. Some components of the game interface may be static, while others may be dynamic (e.g., changing with game play). The user may be able to interact with some components (e.g., cards, player character, NPCs, virtual objects, etc.) and not interact with other components (e.g., the background of the virtual world, such as the virtual street or sidewalk). The user can engage in specific in-game actions or activities by providing input to a game interface. The user can also click on various icons in a game interface to activate various game options.

One skilled in the art would appreciate that the example Interfaces of FIGS. 4-6 are presented as an example of an embodiment of one type of online game and that the present disclosure is intended to encompass a variety of game types, including virtual world games, gambling games, role-playing games, puzzle games, etc.

Data Flow

Figure 11:
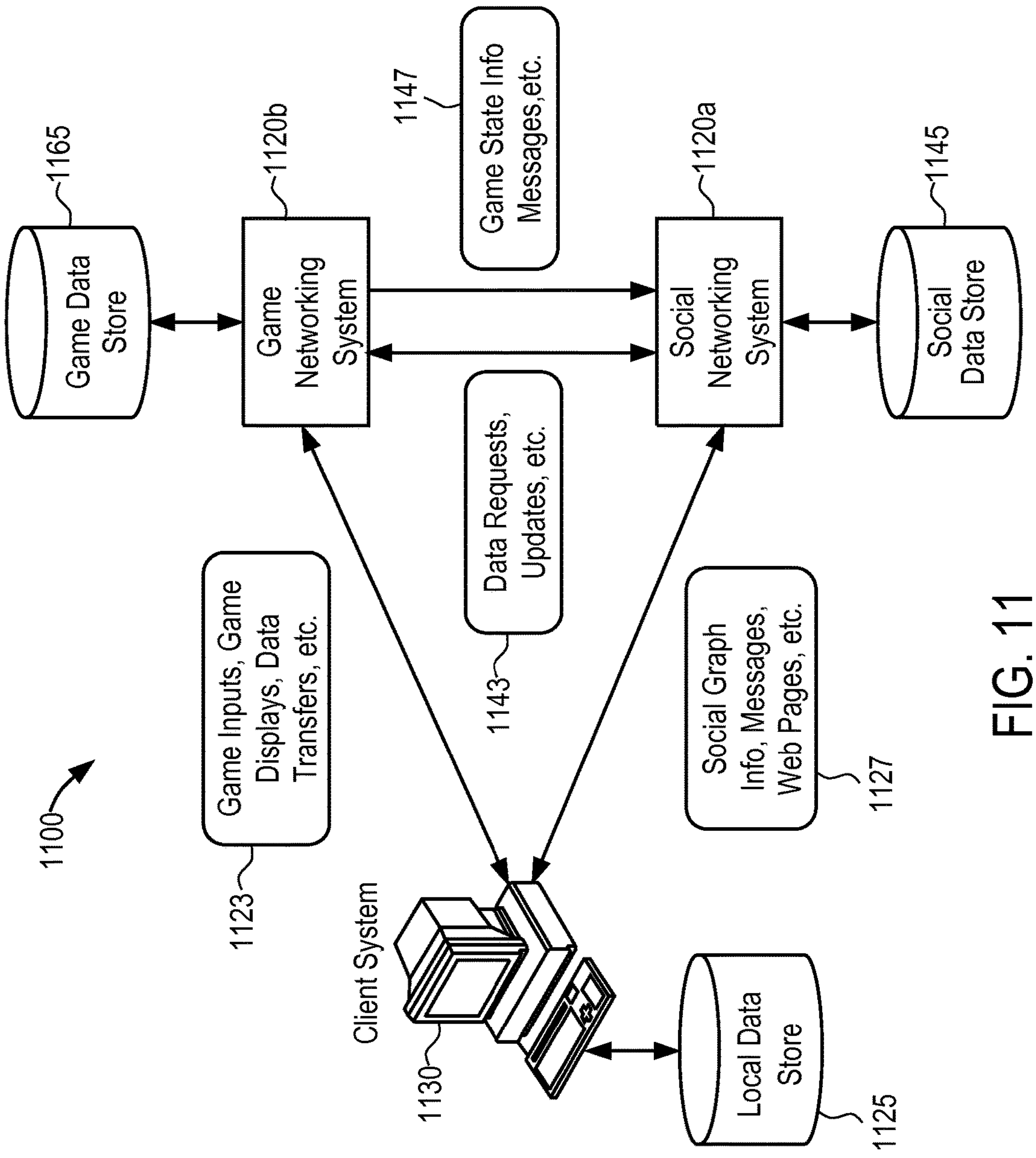
FIG. 11 illustrates an example data flow between example components of the example system of FIG. 1, according to an example embodiment.

FIG. 11 illustrates an example data flow between example components of the example system of FIG. 1, according to an example embodiment. In an example embodiment, system 1100 can include client system 1130, social networking system 1120*a*, and game networking system 1120*b*. The components of system 1100 can be connected to each other in any suitable configuration, using any suitable type of connection. The components may be connected directly or over any suitable network. The client system 1130, the social networking system 1120*a*, and the game networking system 1120*b* can each have one or more corresponding data stores such as local data store 1125, social data store 1145, and game data store 1165, respectively. The social networking system 1120*a* and the game networking system 1120*b* can also have one or more servers that can communicate with the client system 1130 over an appropriate network. The social networking system 1120*a* and the game networking system 1120*b* can have, for example, one or more internet servers for communicating with the client system 1130 via the Internet. Similarly, the social networking system 1120*a* and the game networking system 1120*b* can have one or more mobile servers for communicating with the client system 1130 via a mobile network (e.g., GSM, PCS, Wi-Fi, WPAN, etc.). In some embodiments, one server may be able to communicate with the client system 1130 over both the Internet and a mobile network. In other embodiments, separate servers can be used.

The client system 1130 can receive and transmit data 1123 to and from the game networking system 1120*b*. Data 1123 can include, for example, webpages, messages, game inputs, game displays, rally requests, HTTP packets, data requests, transaction information, updates, and other suitable data. At some other time, or at the same time, the game networking system 1120*b* can communicate data 1143, 1147 (e.g., game state information, game system account information, page info, messages, data requests, updates, etc.) with other networking systems, such as the social networking system 1120*a* (e.g., Facebook, Myspace, etc.). The client system 1130 can also receive and transmit data 1127 to and from the social networking system 1120*a*. Data 1127 can include, for example, webpages, messages, rally requests, social graph information, social network displays, HTTP packets, data requests, transaction information, updates, and other suitable data.

Communication between the client system 1130, the social networking system 1120*a*, and the game networking system 1120*b* can occur over any appropriate electronic communication medium or network using any suitable communications protocols. For example, the client system 1130, as well as various servers of the systems described herein, may include Transport Control Protocol/Internet Protocol (TCP/IP) networking stacks to provide for datagram and transport functions. Any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In some embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In example embodiments, a client request may cause a server to respond with a first data object, such as an HTML page, which itself refers to other data objects. A client application, such as a browser, will request these additional data objects as it parses or otherwise processes the first data object.

In some embodiments, an instance of an online game can be stored as a set of game state parameters that characterize the state of various in-game objects, such as, for example, card parameters, player character state parameters, non-player character parameters, and virtual item parameters. In some embodiments, game state is maintained in a database as a serialized, unstructured string of text data as a so-called Binary Large Object (BLOB). When a player accesses an online game on the game networking system 1120*b*, the BLOB containing the game state for the instance corresponding to the player can be transmitted to the client system 1130 for use by a client-side executed object to process. In some embodiments, the client-side executable may be a FLASH-based game, which can de-serialize the game state data in the BLOB. As a player plays the game, the game logic implemented at the client system 1130 maintains and modifies the various game state parameters locally. The client-side game logic may also batch game events, such as mouse clicks or screen taps, and transmit these events to the game networking system 1120*b*. The game networking system 1120*b* may itself operate by retrieving a copy of the BLOB from a database or an intermediate memory cache (memcache) layer. The game networking system 1120*b* can also de-serialize the BLOB to resolve the game state parameters and execute its own game logic based on the events in the batch file of events transmitted by the client to synchronize the game state on the server side. The game networking system 1120*b* may then re-serialize the game state, now modified, into a BLOB and pass this to a memory cache layer for lazy updates to a persistent database.

With a client-server environment in which the online games may run, one server system, such as the game networking system 1120*b*, may support multiple client systems 1130. At any given time, there may be multiple players at multiple client systems 1130 all playing the same online game. In practice, the number of players playing the same game at the same time may be very large. As the game progresses with each player, multiple players may provide different inputs to the online game at their respective client systems 1130, and multiple client systems 1130 may transmit multiple player inputs and/or game events to the game networking system 1120*b* for further processing. In addition, multiple client systems 1130 may transmit other types of application data to the game networking system 1120*b*.

In some embodiments, a computed-implemented game may be a text-based or turn-based game implemented as a series of web pages that are generated after a player selects one or more actions to perform. The web pages may be displayed in a browser client executed on the client system 1130. As an example and not by way of limitation, a client application downloaded to client system 1130 may operate to serve a set of webpages to a player. As another example and not by way of limitation, a computer-implemented game may be an animated or rendered game executable as a stand-alone application or within the context of a webpage or other structured document. In example embodiments, the computer-implemented game may be implemented using Adobe Flash-based technologies. As an example and not by way of limitation, a game may be fully or partially implemented as a SWF object that is embedded in a web page and executable by a Flash media player plug-in. In some embodiments, one or more described webpages may be associated with or accessed by the social networking system 1120*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (i.e., be updated) at any time. When an update to an application datum occurs at the client system 1130, caused either by an action of a game player or by the game logic itself, the client system 1130 may need to inform the game networking system 1120*b* of the update. In such an instance, the application event data may identify an event or action (e.g., harvest) and an object in the game to which the event or action applies. For illustration purposes and not by way of limitation, system 1100 is discussed in reference to updating a multi-player online game hosted on a network-addressable system (such as, for example, the social networking system 1120*a* or the game networking system 1120*b*), where an instance of the online game is executed remotely on the client system 1130, which then transmits application event data to the hosting system such that the remote game server synchronizes game state associated with the instance executed by the client system 1130.

In an example embodiment, one or more objects of a game may be represented as an Adobe Flash object. Flash may manipulate vector and raster graphics, and supports bidirectional streaming of audio and video. "Flash" may mean the authoring environment, the player, or the application files. In some embodiments, the client system 1130 may include a Flash client. The Flash client may be configured to receive and run Flash application or game object code from any suitable networking system (such as, for example, the social networking system 1120*a* or the game networking system 1120*b*). In some embodiments, the Flash client may be run in a browser client executed on the client system 1130. A player can interact with Flash objects using the client system 1130 and the Flash client. The Flash objects can represent a variety of in-game objects. Thus, the player may perform various in-game actions on various in-game objects by make various changes and updates to the associated Flash objects. In some embodiments, in-game actions can be initiated by clicking or similarly interacting with a Flash object that represents a particular in-game object. For example, a player can interact with a Flash object to use, move, rotate, delete, attack, shoot, or battle an in-game object. This disclosure contemplates performing any suitable in-game action by interacting with any suitable Flash object. In some embodiments, when the player makes a change to a Flash object representing an in-game object, the client-executed game logic may update one or more game state parameters associated with the in-game object. To ensure synchronization between the Flash object shown to the player at the client system 1130, the Flash client may send the events that caused the game state changes to the in-game object to game networking system 1120*b*. However, to expedite the processing and hence the speed of the overall gaming experience, the Flash client may collect a batch of some number of events or updates into a batch file. The number of events or updates may be determined by the Flash client dynamically or determined by the game networking system 920*b* based on server loads or other factors. For example, the client system 1130 may send a batch file to the game networking system 1120*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In example embodiments, each application datum may have a name and a value. The value of an application datum may change at any time in response to the game play of a player or in response to the game engine (e.g., based on the game logic). In some embodiments, an application data update occurs when the value of a specific application datum is changed. In example embodiments, each application event datum may include an action or event name and a value (such as an object identifier). Each application datum may be represented as a name-value pair in the batch file. The batch file may include a collection of name-value pairs representing the application data that have been updated at client system 930. In some embodiments, the batch file may be a text file and the name-value pairs may be in string format.

In example embodiments, when a player plays an online game on the client system 1130, the game networking system 1120*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In some embodiments, while a player is not playing the online game, the corresponding BLOB may be stored in the database. This enables a player to stop playing the game at any time without losing the current state of the game the player is in. When a player resumes playing the game next time, the game networking system 1120*b* may retrieve the corresponding BLOB from the database to determine the most-recent values of the game-related data. In example embodiments, while a player is playing the online game, the game networking system 1120*b* may also load the corresponding BLOB into a memory cache so that the game system may have faster access to the BLOB and the game-related data contained therein.

Systems and Methods

In example embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 12:
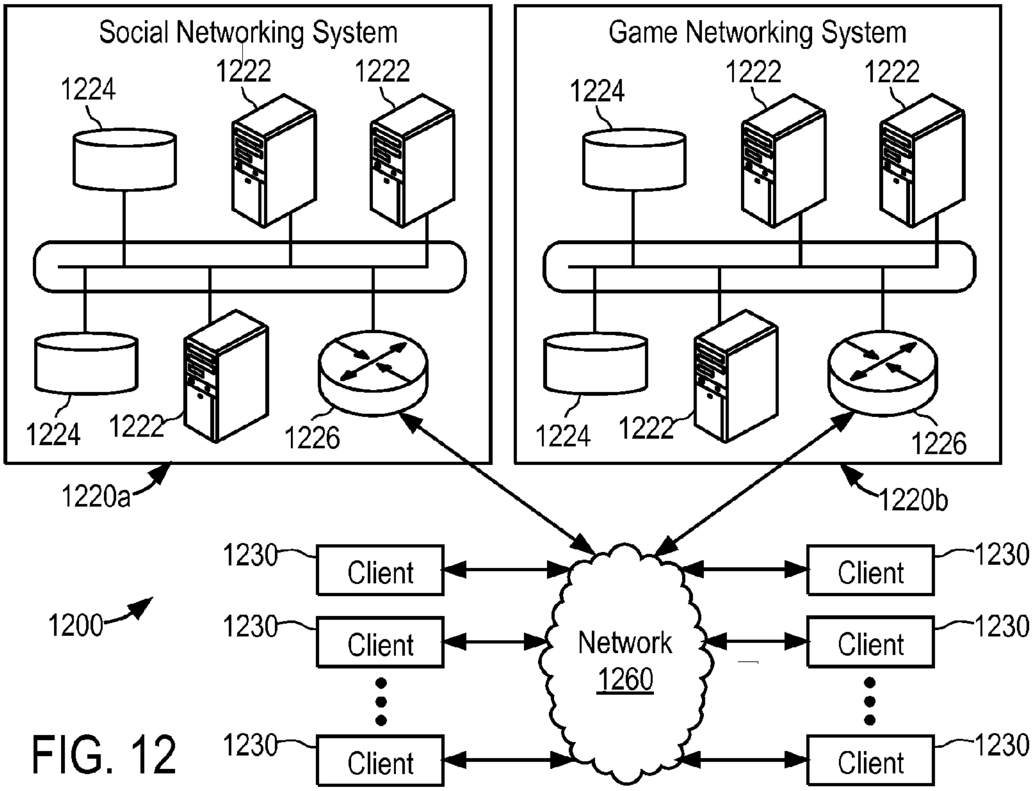
FIG. 12 illustrates an example network environment in which various example embodiments may operate, according to an example embodiment.
Figure 13:
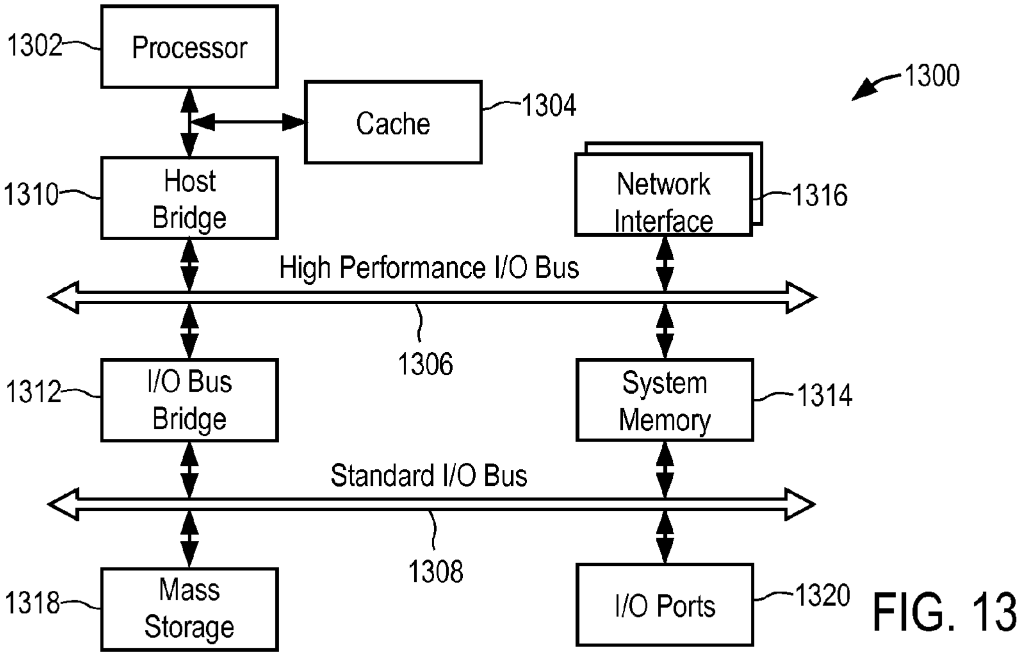
FIG. 13 illustrates an example computing system architecture, which may be used to implement one or more of the methodologies described herein, according to an example embodiment.

Some embodiments may operate in a wide area network environment, such as the Internet, including multiple network addressable systems. FIG. 12 illustrates an example network environment 1200 in which various example embodiments may operate, according to an example embodiment. Network cloud 1060 generally represents one or more interconnected networks, over which the systems and hosts described herein can communicate. Network cloud 1260 may include packet-based wide area networks (such as the Internet), private networks, wireless networks, satellite networks, cellular networks, paging networks, and the like. As FIG. 13 illustrates, some embodiments may operate in a network environment comprising one or more networking systems, such as the social networking system 1220*a*, game networking system 1220*b*, and one or more client systems 1220. The components of the social networking system 1220*a* and the game networking system 1220*b* operate analogously; as such, hereinafter they may be referred to simply as networking system 1220. The client systems 1220 are operably connected to the network environment via a network service provider, a wireless carrier, or any other suitable means.

The networking system 1220 is a network addressable system that, in various example embodiments, comprises one or more physical servers 1222 and data stores 1224. The one or more physical servers 1222 are operably connected to computer network 1260 via, by way of example, a set of routers and/or networking switches 1226. In an example embodiment, the functionality hosted by the one or more physical servers 1222 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

The physical servers 1222 may host functionality directed to the operations of the networking system 1220. Hereinafter servers 1222 may be referred to as server 1222, although server 1222 may include numerous servers hosting, for example, the networking system 1220, as well as other content distribution servers, data stores, and databases. The data store 1224 may store content and data relating to, and enabling, operation of the networking system 1220 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, the data store 1224 corresponds to one or more of a variety of separate and integrated databases, such as relational databases and object-oriented databases that maintain information as an integrated collection of logically related records or files stored on one or more physical systems. Structurally, the data store 1224 may generally include one or more of a large class of data storage and management systems. In particular embodiments, the data store 1224 may be implemented by any suitable physical system(s) including components, such as one or more database servers, mass storage media, media library systems, storage area networks, data storage clouds, and the like. In one example embodiment, the data store 1224 includes one or more servers, databases (e.g., MySQL), and/or data warehouses. The data store 1224 may include data associated with different networking system 1220 users and/or client systems 1220.

The client system 1220 is generally a computer or computing device including functionality for communicating (e.g., remotely) over a computer network. The client system 1220 may be a desktop computer, laptop computer, personal digital assistant (PDA), in- or out-of-car navigation system, smart phone or other cellular or mobile phone, or mobile gaming device, among other suitable computing devices. The client system 1220 may execute one or more client applications, such as a web browser (e.g., Microsoft Internet Explorer, Mozilla Firefox, Apple Safari, Google Chrome, and Opera), to access and view content over a computer network. In some embodiments, the client applications allow a user of the client system 1030 to enter addresses of specific network resources to be retrieved, such as resources hosted by the networking system 1220. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1220 desires to view a particular webpage (hereinafter also referred to as target structured document) hosted by the networking system 1220, the user's web browser, or other document rendering engine or suitable client application, formulates and transmits a request to the networking system 1220. The request generally includes a URL or other document identifier as well as metadata or other information. By way of example, the request may include information identifying the user, such as a user ID, as well as information identifying or characterizing the web browser or operating system running on the user's client computing device 1220. The request may also include location information identifying a geographic location of the user's client system or a logical network location of the user's client system. The request may also include a timestamp identifying when the request was transmitted.

Although the example network environment described above and illustrated in FIG. 12 described with respect to the social networking system 1220*a* and the game networking system 1220*b*, this disclosure encompasses any suitable network environment using any suitable systems. As an example and not by way of limitation, the network environment 1200 may include online media systems, online reviewing systems, online search engines, online advertising systems, or any combination of two or more such systems.

FIG. 13 illustrates an example computing system architecture 1300, which may be used to implement one or more of the methodologies described herein, according to an example In one embodiment, hardware system 1300 comprises a processor 1302, a cache memory 1304, and one or more executable modules and drivers, stored on a tangible computer readable medium, directed to the functions described herein. Additionally, hardware system 1300 may include a high performance input/output (I/O) bus 1306 and a standard I/O bus 1308. A host bridge 1310 may couple processor 1302 to high performance I/O bus 1306, whereas I/O bus bridge 1312 couples the two buses 1306 and 1308 to each other. A system memory 1314 and one or more network/communication interfaces 1316 may couple to bus 1306. Hardware system 1300 may further include video memory (not shown) and a display device coupled to the video memory. Mass storage 1318 and I/O ports 1320 may couple to bus 1308. Hardware system 1300 may optionally include a keyboard, a pointing device, and a display device (not shown) coupled to bus 1308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1300 are described in greater detail below. In some embodiments, network interface 1316 provides communication between hardware system 1300 and any of a wide range of networks, such as an Ethernet (e.g., IEEE 802.3) network, a backplane, etc. Mass storage 1318 provides permanent storage for the data and programming instructions to perform the above-described functions implemented in servers 1222, whereas system memory 1314 (e.g., DRAM) provides temporary storage for the data and programming instructions when executed by processor 1302. I/O ports 1320 are one or more serial and/or parallel communication ports that provide communication between additional peripheral devices, which may be coupled to hardware system 1300.

Hardware system 1300 may include a variety of system architectures and various components of hardware system 1300 may be rearranged. For example, cache 1304 may be on-chip with processor 1302. Alternatively, cache 1304 and processor 1302 may be packed together as a "processor module," with processor 1302 being referred to as the "processor core." Furthermore, certain embodiments of the present disclosure may not require nor include all of the above components. For example, the peripheral devices shown coupled to standard I/O bus 1308 may couple to high performance I/O bus 1306. In addition, in some embodiments, only a single bus may exist, with the components of hardware system 1300 being coupled to the single bus. Furthermore, hardware system 1300 may include additional components, such as additional processors, storage devices, or memories.

An operating system manages and controls the operation of hardware system 1300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:

providing to a player of a computer-implemented online game an in-game capability available to the player in competitive gameplay, the in-game capability being based on the player having an associated game object and comprising an object-specific ability unique to the associated game object, the player being a member of an associated guild having a plurality of members, each member of the guild being a respective human player of the game, with competitive gameplay occurring between members of different guilds;

in an automated operation performed by one or more processors, calculating a guild effect value for the player based at least in part on one or more guild metrics for the associated guild, the one or more guild metrics including a game activity metric that is variable responsive to variation in a count of corresponding guild members who played the game within a predefined preceding time period; and setting a value for a variable attribute of the in-game capability based at least in part on the calculated guild effect value, the variable attribute of the in-game capability comprising a trigger probability that indicates a probability for actual availability of the object-specific ability during competitive gameplay.

2. The method of claim 1, wherein the game activity metric is an active member value indicating how many guild members actively played the game within the predefined preceding period.

3. The method of claim 1, wherein the one or more guild metrics include a guild size metric based on how many players are members of the associated guild.

4. The method of claim 1, wherein the one or more guild metrics further include a guild size metric based on how many players are members of the associated guild, the calculating of the guild effect value being such that sensitivity of the guild effect value to proportional changes in the game activity metric decreases with an increase in the guild size metric.

5. The method of claim 1, wherein the player has a plurality of game objects together providing to the player a plurality of object-specific abilities, the method further comprising setting respective values for variable attributes of the plurality of object-specific abilities based at least in part on the calculated guild effect value.

6. The method of claim 5, further comprising determining the respective variable attributes based on the calculated guild effect value, which applies in common to the plurality of game objects.

7. The method of claim 1, further comprising executing an in-game action associated with the in-game capability based at least in part on the calculated guild effect value.

8. A system comprising:

a game engine configured to provide to a player of a computer-implemented online game an in-game capability available to the player in competitive gameplay, the in-game capability being based on the player having an associated game object and comprising an object-specific ability unique to the associated game object, the player being a member of an associated guild having a plurality of members, each member of the guild being a respective human player of the game, with competitive gameplay occurring between members of different guilds; and a guild effect module configured to calculate a guild effect value for the player based at least in part on one or more guild metrics for the associated guild, the one or more guild metrics including a game activity metric that is variable responsive to variation in a count of corresponding guild members who played the game within a predefined preceding time period, and to set a value for a variable attribute of the in-game capability based at least in part on the calculated guild effect value, the variable attribute of the in-game capability comprising a trigger probability that indicates a probability for actual availability of the object-specific ability during competitive gameplay.

9. The system of claim 8, wherein the game activity metric is an active member value indicating how many guild members actively played the game within the predefined preceding period.

10. The system of claim 8, wherein the one or more guild metrics include a guild size metric based on how many players are members of the associated guild.

11. The system of claim 8, wherein the one or more guild metrics further include a guild size metric based on how many players are members of the associated guild, the calculating of the guild effect value being such that sensitivity of the guild effect value to proportional changes in the game activity metric decreases with an increase in the guild size metric.

12. The system of claim 8, wherein the player has a plurality of game objects together providing to the player a plurality of object-specific abilities, the guild effect module being configured to set respective values for variable attributes of the plurality of object-specific abilities based at least in part on the calculated guild effect value.

13. A non-transitory machine-readable storage medium including instructions to cause a computer, when the instructions are executed by the computer, to perform operations comprising:

providing to a player of a computer-implemented online game an in-game capability available to the player in competitive gameplay, the in-game capability being based on the player having an associated game object and comprising an object-specific ability unique to the associated game object, the player being a member of an associated guild having a plurality of members, each member of the guild being a respective human player of the game, with competitive gameplay occurring between members of different guilds;

calculating a guild effect value for the player based at least in part on one or more guild metrics for the associated guild, the one or more guild metrics including a game activity metric that is variable responsive to variation in a count of corresponding guild members who played the game within a predefined preceding time period;

setting a value for a variable attribute of the in-game capability based at least in part on the calculated guild effect value, the variable attribute of the in-game capability comprising a trigger probability that indicates a probability for actual availability of the object-specific ability during competitive gameplay.

* * * * *